(No Model.)

W. A. WARNER.
AXLE NUT.

No. 490,694. Patented Jan. 31, 1893.

Witnesses
F. W. Johnson
D. P. Welhaupter

Inventor
William A. Warner
By his Attorneys,
C. A. Snow & Co.

UNITED STATES PATENT OFFICE.

WILLIAM A. WARNER, OF BETHEL, ASSIGNOR TO DANIEL WARNER, OF BRONSON, MICHIGAN.

AXLE-NUT.

SPECIFICATION forming part of Letters Patent No. 490,694, dated January 31, 1893.

Application filed April 15, 1892. Serial No. 429,337. (No model.)

*To all whom it may concern:*

Be it known that I, WILLIAM A. WARNER, a citizen of the United States, residing at Bethel, in the county of Branch and State of Michigan, have invented a new and useful Axle-Nut, of which the following is a specification.

This invention relates to vehicle axles; and it has for its object to provide an improved axle nut and take up sleeve or collar used in connection therewith.

To this end it is the main object of this invention to provide such a device, which while simple in construction at the same time provides means for preventing the rattling of wheels and for taking up the wear on the end of the axle box and thus preventing the same from sliding back and forth upon the spindle and loosen the entire wheel.

With these and many other objects in view which will readily appear as the nature of the invention is better understood, the same consists in the novel construction combination and arrangement of parts hereinafter more fully described, illustrated and claimed.

Figure 1:
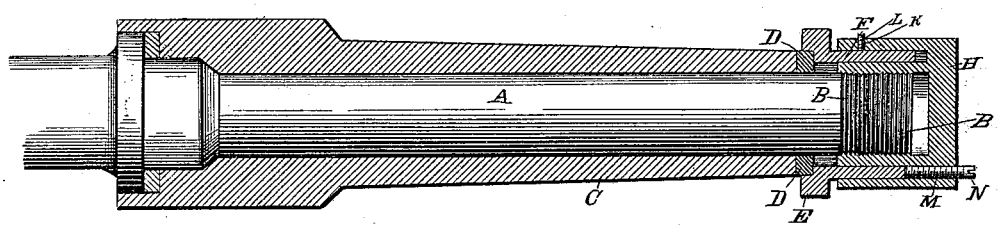
Figure 2:
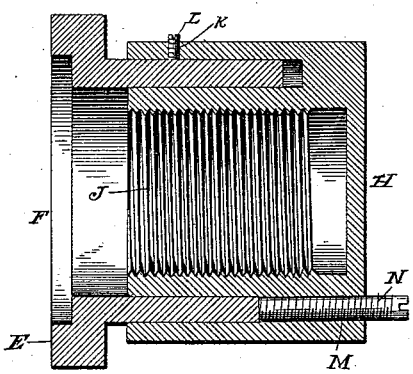
Figure 3:
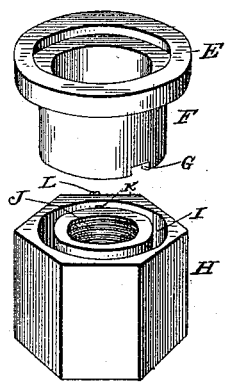

In the accompanying drawings:—Figure 1 is a longitudinal sectional view of an axle box and spindle having my improved nut and take up sleeve or collar connected therewith. Fig. 2 is an enlarged detail sectional view of the device. Fig. 3 is a detail in perspective of the nut and adjusting collar detached from each other.

Referring to the accompanying drawings;— A represents an ordinary axle spindle having the usual threaded end B, and accommodating the ordinary axle box C fitting thereover and terminating short of said threaded end, and if necessary, having resting against said outer end the usual washer D. A shouldered take-up collar E bears against and laps the outer end of the axle box or the washer thereagainst, and is provided with the extended adjusting thimble or sleeve F which is of a larger diameter than said threaded spindle end and is provided with a notch G in the outer edge thereof for the purpose to be presently described. The said outwardly extending thimble F is received by the axle-cap nut H, provided in one face thereof with a deep circular groove I, which is designed for the reception of said thimble and allows the same to slide therein, when it is found necessary to take up the wear of the axle box by forcing said thimble from without the cap nut and pressing the collar tightly against the axle box end. The cap-nut H is provided with an interiorly threaded bore J, engaging the threaded end of the spindle and thus holding the collar and thimble in position, and the same is further provided with the threaded perforation K, in one face thereof, which receives the binding screw L, working therein and impinging upon the sleeve F to hold the nut and thimble tightly together and prevent the latter from turning. The nut cap H is further provided in the outer end thereof with the threaded perforation M, opening through said cap into the deep circular groove therein, and accommodating the adjusting screw N working therein and said circular groove within said cap, and designed to engage the notch G in the outer edge of the thimble F, so as to provide for a fixed sliding movement of said thimble or sleeve from without the grooved cap nut and also to prevent the same from turning, in addition to the binding screw already described. It will of course be observed that the said cap nut may be of any desired shape, being preferably of the polygonal type, and it will also be readily seen, that the said nut carrying the thimble collar, which practically forms a part of the nut itself, may be readily and quickly placed upon the threaded spindle end of the vehicle and tightened against the axle box upon said spindle. Now as the boxing wears out and necessarily becomes shorter, by relieving the thimble of the binding screw L, and screwing the outer adjusting screw N, farther into the groove of the cap nut, the collar E may be easily crowded up against the axle box to take up the wear thereof and again hold the same tightly in position upon the axle and prevent it from working loose in the hub.

The construction, operation and many advantages of the herein described axle nut and take up device are apparent without further description.

Having thus described my invention, what I claim and desire to secure by Letters Patent is;—

1. The combination with an axle spindle and the axle box, of a sectional axle nut comprising a cap nut having an exteriorly threaded bore engaging the spindle and a deep circular groove surrounding the bore, a take up collar having an end flange or shoulder overlapping the axle box end and a thimble sliding in said circular groove, and means for adjusting said thimble in said groove, substantially as set forth.

2. The combination with an axle spindle and the axle box; of a sectional axle nut comprising a cap nut having an interiorly threaded bore engaging the spindle end, a deep circular groove surrounding the bore, a threaded perforation in one face and a threaded perforation in the outer end thereof and opening into said circular groove, a shouldered take-up collar overlapping the axle box end and having a thimble sliding in said circular groove and provided with a notch, a binding screw working in the perforation in the face of said nut and adapted to impinge upon said thimble, and an adjusting screw working in said end perforation into said circular groove and engaging said notch, substantially as set forth.

In testimony that I claim the foregoing as my own I have hereto affixed my signature in the presence of two witnesses.

WILLIAM A. WARNER.

Witnesses:
BRUCE S. HAWLEY,
G. A. McMASTER.